(12) United States Patent
Zhang et al.

(10) Patent No.: US 10,103,833 B2
(45) Date of Patent: Oct. 16, 2018

(54) INTERFERENCE CONTROL METHOD AND APPARATUS IN SELF-ORGANIZING SYSTEM

(75) Inventors: Yi Zhang, Beijing (CN); Wei Hua Zhou, Beijing (CN); Shun Liang Zhang, Beijing (CN); Richard Waldhauser, München (DE); Angelo Centonza, Winchester (DE)

(73) Assignee: Nokia Solutions and Network Oy, Espoo (FI)

( * ) Notice: Subject to any disclaimer, the term of this patent is extended or adjusted under 35 U.S.C. 154(b) by 417 days.

(21) Appl. No.: 13/515,992

(22) PCT Filed: Dec. 17, 2009

(86) PCT No.: PCT/CN2009/075662
§ 371 (c)(1),
(2), (4) Date: Jun. 14, 2012

(87) PCT Pub. No.: WO2011/072446
PCT Pub. Date: Jun. 23, 2011

(65) Prior Publication Data
US 2012/0250565 A1 Oct. 4, 2012

(51) Int. Cl.
*H04L 1/16* (2006.01)
*H04J 11/00* (2006.01)
(Continued)

(52) U.S. Cl.
CPC ....... *H04J 11/0053* (2013.01); *H04J 11/0056* (2013.01); *H04W 84/18* (2013.01); *H04W 36/20* (2013.01); *H04W 84/045* (2013.01)

(58) Field of Classification Search
CPC .. H04J 11/0023; H04J 11/005; H04J 11/0053; H04J 11/0056; H04W 84/18;
(Continued)

(56) References Cited

U.S. PATENT DOCUMENTS

2005/0074030 A1* 4/2005 Cho ................. H04W 99/00
370/474
2006/0013179 A1* 1/2006 Yamane .................. 370/338
(Continued)

FOREIGN PATENT DOCUMENTS

CN 101421990 A 4/2009
WO WO 2007/055856 A1 5/2007

OTHER PUBLICATIONS

Luciano Sarperi et al; IEEE C802.16m-09/1676, Interference Mitigation for CSG Femto ABS (Amendment Draft 15.4.11); 2009; Aug. 28, 2009, pp. 1-6, XP017798455, [retrieved on Aug. 28, 2009], p. 2.
(Continued)

*Primary Examiner* — Kan Yuen
(74) *Attorney, Agent, or Firm* — Harrington & Smith

(57) ABSTRACT

An interference control method and apparatus in a self-organizing system are provided. The method includes the following steps: interference information is received at an access node from at least two other access nodes, wherein the other access nodes serve communication devices interfered by the access node; then the interference information is evaluated at the access node to determine at least one action that could be taken because of the interference; information about the determined at least one action is communicated to at least one of the at least two other access nodes, and the recipient node is operated accordingly.

20 Claims, 6 Drawing Sheets

(51) Int. Cl.
*H04W 84/18* (2009.01)
*H04W 36/20* (2009.01)
*H04W 84/04* (2009.01)

(58) Field of Classification Search
CPC .. H04W 84/045; H04W 84/005; H04W 36/20
USPC .......................... 370/252, 328, 338; 455/434
See application file for complete search history.

(56) References Cited

U.S. PATENT DOCUMENTS

2007/0280170 A1* 12/2007 Kawasaki ..................... 370/331
2009/0042593 A1   2/2009 Yavuz et al. ................. 455/522
2009/0253448 A1* 10/2009 Kwon et al. .................. 455/501
2009/0253450 A1   10/2009 Gupta
2009/0275337 A1* 11/2009 Maeda et al. ................. 455/442

OTHER PUBLICATIONS

NFMN Alliance "NGMN Recommendation on Son & O&M Requirements" XP050335477, S5-090009; 2008; 3GPP Dec. 23, 2008.

* cited by examiner

INTERFERENCE CONTROL METHOD AND APPARATUS IN SELF-ORGANIZING SYSTEM

This disclosure relates to interference management in a communication system comprising a plurality of stations.

A communication system can be seen as a facility that enables communication sessions between two or more entities such as mobile communication devices and/or other stations associated with the communication system. A communication system, stations thereof and compatible communication devices typically operate in accordance with a given standard or specification which sets out what the various entities associated with the system are permitted to do and how that should be achieved. Communication protocols and/or parameters which shall be used for the connection are also typically defined. For example, the manner how the communication device can access the communication system and how communication shall be implemented between communicating devices, the elements of the communication network and/or other communication devices is typically based on predefined communication protocols.

In a wireless communication system at least a part of the communication between at least two wireless devices occurs over a wireless link. Examples of wireless systems include public land mobile networks (PLMN), satellite based communication systems and different wireless local networks, for example wireless local area networks (WLAN). The wireless systems can be divided into cells, and are therefore often referred to as cellular systems.

A user can access the communication system by means of an appropriate communication device. A communication device of a user is often referred to as user equipment (UE). A communication device is provided with an appropriate signal receiving and transmitting arrangement for enabling communications with other parties. Typically a communication device is used for enabling the users thereof to receive and transmit communications such as speech and data. In wireless systems, a communication device provides a transceiver that can communicate with e.g. a base station of an access network and/or another communications device. Depending on the context, a communication device may also be considered as being a part of a communication system. In certain applications, for example in ad-hoc networks, the communication system can at least partially be based on use of a plurality of user equipment capable of communicating with each other. Since the coverage of the modern wireless communications systems is widespread, mobile users can be located virtually anywhere, for example at home, office, train, street, another public space and so on.

The communication may comprise, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. The user may also be provided broadcast or multicast content. Non-limiting examples of the content include downloads, television and radio programs, videos, advertisements, various alerts and other information.

$3^{rd}$ Generation Partnership Project (3GPP) is standardizing an architecture that is known as the long-term evolution (LTE) of the Universal Mobile Telecommunications System (UMTS) radio-access technology. A further development of the LTE is referred to herein as LTE-Advanced. In LTE based system, one possible access node or base station class is defined to comprise the so-called femto (access) nodes. The femto nodes are different from e.g. macro nodes in that they can roughly be said to be simpler and serve smaller areas. The femto nodes are typically deployed in indoor environments, preferably in plug-and-play or self-organizing network (SON) fashion. They can also be provided with access limitations so that only a configured group of subscribers is allowed to access a femto node. For example in residential deployment of a femto node only family members may be a part of a configured subscriber group and other users can not access the femto node. An example for a femto system architecture is shown in FIG. 1.

In certain applications LTE femto nodes may also be referred to as home enhanced NodeBs (HeNBs). It is noted, though, that in this specification the term home eNB is intended to cover any LTE femto (access) node, regardless its location and use environment, and thus term shall also be understood to cover similar femto nodes that may be used for example by enterprises, such as in offices, warehouses and/or factories and/or in public places, for example in shopping malls, sports or exhibition halls, particular areas of cities and so on.

The demand for capacity by broadband and wireless broadband traffic over the internet has increased. Users who are located in a certain space or area, for example at home or office, are becoming increasingly important target customers for wireless operators and solution providers. Femto type architectures are considered as a way to address these demands. Self Organizing Network (SON) arrangements are a possible technology to provide appropriate local systems.

As in any wireless system, interference by neighbouring nodes or stations can become an issue also in a femto system. Interference can also be caused between the macro and femto stations. Although the individual femto nodes can try to address this in the self-organizing network, problems may arise for example because neighbouring femto nodes may make conflicting decisions, for example, in view of interference from a source.

Embodiments of the invention aim to address one or several of the above issues.

In accordance with an embodiment there is provided a method for interference control in a self-organizing system, the method comprising receiving at an access node interference information from at least two other access nodes, wherein the other access nodes serve communication devices that are interfered by the access node, evaluating the interference information at the access node to determine at least one action that could be taken because of the interference, and sending information about the at least one action to at least one of the at least two other access nodes.

In accordance with another embodiment there is provided a method for interference control in a self-organizing system, the method comprising detecting at an access node serving at least one communication device that the at least one communication device is interfered by another access node, sending to the other access node interference information from the access node, receiving at the access node information from the other access node about at least one action that can be taken to mitigate the effects of the interference, said at least one action being determined based on said interference information by the access node and interference information from at least one further access node serving at least one further communication device that is interfered by the other access node, and operating the access node by taking into account the received information.

In accordance with another embodiment there is provided an apparatus for an access node in a self-organizing system, comprising control means for evaluating interference information received at the access node from at least two other access nodes, wherein the other access nodes serve communication devices that are interfered by the access node, to determine at least one action that could be taken because of the interference and for causing sending of information about the at least one action to at least one of the at least two other access nodes.

In accordance with yet another embodiment there is provided an apparatus for an access node in a self-organizing system, comprising control means for detecting that at least one communication device served by the access node is interfered by another access node, for causing sending of interference information to the other access node, evaluating information from the other access node about at least one action available to mitigate the effects of the interference, said at least one action being determined based on said interference information by the access node and interference information from at least one further access node serving at least one further communication device that is interfered by the other access node, and to control operation of the access node such that the received information is taken into account.

In accordance with a more detailed embodiment, interference management notifications can be communicated from at least two access nodes serving interfered communication devices. Acknowledgements to the interference management notifications may be communicated in response, the acknowledgements including information about a network level decision by the interfering access node.

The interference information may comprise network level decisions by access nodes serving interfered communication devices. The interfering access node may evaluate that the network level decisions are in conflict, select one of the network level decisions, and based on the selection, send information about at least one action that shall be taken by at least one access node.

According to another embodiment the interference information may comprise at least one request based on a network level decision by one access node and at least one notification based on evaluation by another other access node. The interfering access node may then evaluate the received interference information to determine if the request shall be accepted or rejected and send a response to the request and an acknowledgment to the notification accordingly.

The interfering access node may send a request for more information before determining said at least one action.

The access nodes each may comprise a femto access point. According to a possibility the access nodes comprise at least one macro access node and at least one femto access node.

The interference information may be based on reports by communication devices served by the at least two access nodes.

A computer program comprising program code means adapted to perform the herein described methods may also be provided. In accordance with further embodiments apparatus and/or computer program product that can be embodied on a computer readable medium for providing at least one of the above methods is provided.

Various other aspects and further embodiments are described in the following detailed description and in the attached claims.

The invention will now be described in further detail, by way of example only, with reference to the following examples and accompanying drawings, in which:

FIG. 1 shows schematically a network architecture in which some embodiments of the present invention may be implemented;

FIG. 2 schematically shows control apparatus for an access node;

FIG. 3 schematically shows an interference scenario;

Figure 1:
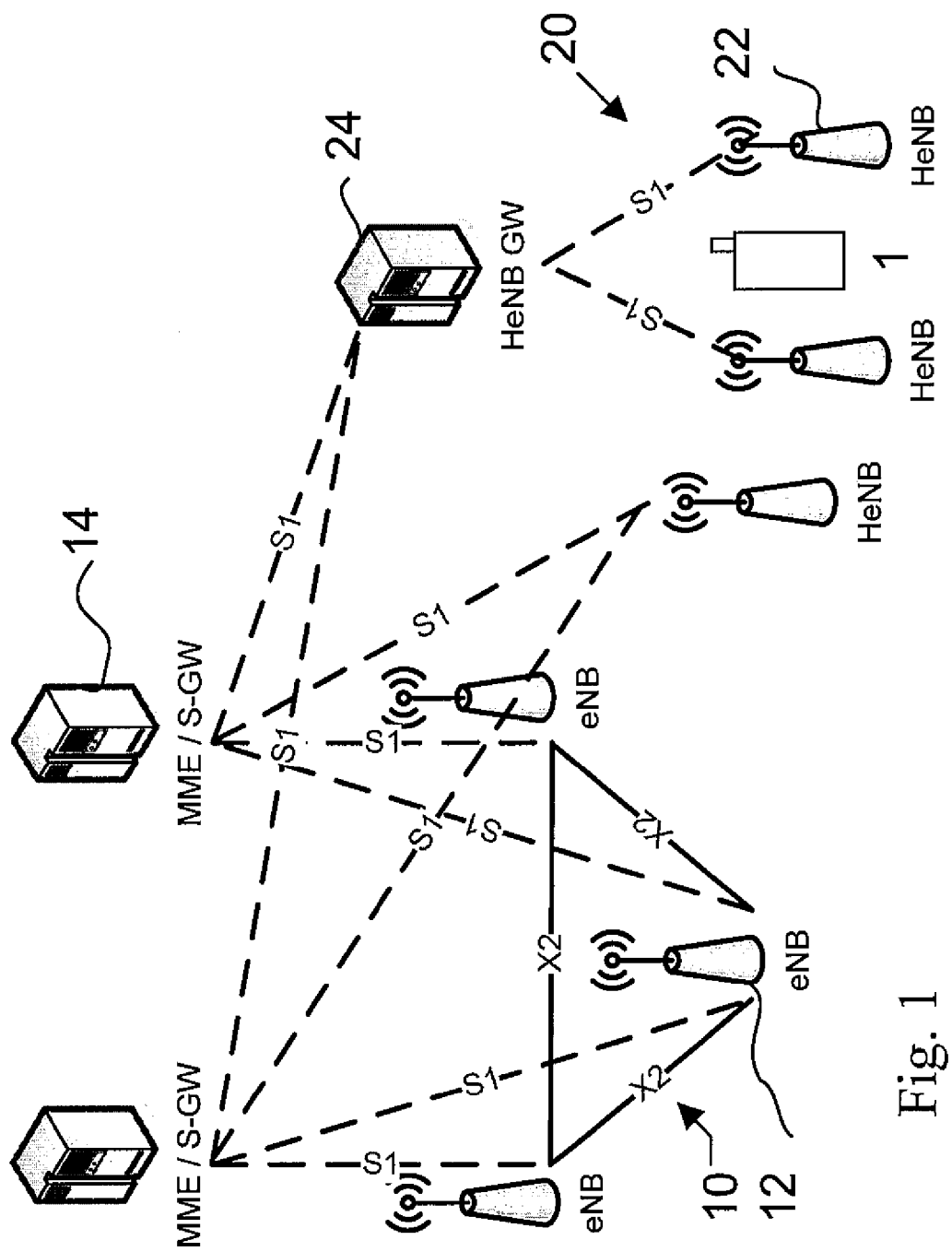

In the following certain exemplifying embodiments are explained with reference to wireless or mobile communication systems serving mobile communication devices. Before explaining in detail the certain exemplifying embodiments, certain general principles of a wireless communication system and the nodes thereof are briefly explained with reference to FIGS. 1 and 2 to assist in better understanding of the herein described embodiments.

In a wireless system a user can be provided with a mobile communication or user device 1 that can be used for accessing various services and/or applications. The access can be provided via an access interface between the mobile user devices 1 and an appropriate wireless access system. An appropriate mobile user device or station 1 may be provided by any device capable of sending and receiving radio signals. Non-limiting examples include a mobile station (MS), a portable computer provided with a wireless interface card or other wireless interface facility, personal data assistant (PDA) provided with wireless communication capabilities, or any combinations of these or the like. A wireless mobile communication device is often referred to as a user equipment (UE).

A communication device can be used for accessing various services and/or applications provided via the wider communication system. In wireless or mobile communication systems the access is provided via an access interface between the mobile communication device 1 and an appropriate wireless access node. A mobile device 1 can typically access wirelessly a communication system via at least one base station or similar wireless transmitter and/or receiver node of the access system. A base station site typically provides one or more cells of a cellular system. In the FIG. 1 example each of the base stations 12 and 22 is configured to provide a cell, but could provide, for example, three sectors, each sector providing a cell. Each mobile device 1 and base station may have one or more radio channels open at the same time and may receive signals from more than one source.

A base station is typically controlled by at least one appropriate controller so as to enable operation thereof and management of mobile communication devices in communication with the base station. The control entity can be interconnected with other control entities. A base station controller is shown and described later in more detail with reference to FIG. 2.

A communication device can be used for accessing various services and/or applications. The communication devices can access the communication system based on various access techniques, such as code division multiple access (CDMA), or wideband CDMA (WCDMA). The latter technique is used by communication systems based on the third Generation Partnership Project (3GPP) specifications. Other examples include time division multiple access (TDMA), frequency division multiple access (FDMA), space division multiple access (SDMA) and so on. A non-limiting example of mobile architectures where the herein described principles may be applied is known as the Evolved Universal Terrestrial Radio Access Network (E-UTRAN). Non-limiting examples of appropriate access nodes are a base station of a cellular system, for example what is known as NodeB (NB) or enhanced NodeB (eNB) in the vocabulary of the 3GPP specifications. The macro level eNBs 12 of FIG. 1 may provide E-UTRAN features such as user plane Radio Link Control/Medium Access Control/Physical layer protocol (RLC/MAC/PHY) and control plane Radio Resource Control (RRC) protocol terminations towards mobile communication devices. Other examples include base stations of systems that are based on technologies such as wireless local area network (WLAN) and/or WiMax (Worldwide Interoperability for Microwave Access).

A difference between access nodes 12 and 22 of FIG. 1 is that access nodes 12 provide macro level 10 base stations, or to use the vocabulary of the 3GPP, macro eNBs. The nodes 22 are femto level 20 nodes, also known as home eNodeBs or local area access points. By way of example only, femto nodes 22 can have lower transmission power compared to ordinary NodeBs or eNBs 12 and cheaper RF components such as oscillators and filters, due to relaxed requirements in standards. For example, in LTE HeNB transmission power can be about 100 times lower compared to the transmission power of an eNB and frequency stability requirements are in between the requirements of an eNB and a user equipment. The transmission and reception range for femto nodes may be adapted to residential indoor scenarios. For example, envisaged data rates can be 50 to 100 Mbit/s in the downlink with an average coverage range of 10 meters. Femto nodes, such as access points 22, are relatively low power nodes that may be deployed to provide enhanced indoor coverage, additional capacity at hotspots or cell edge regions. For example, in the case of indoor deployment, such an access point or node may be provided for example in apartment blocks and hence there may be a relatively high density of such access nodes. These nodes may be operated on the same carrier frequency as the overlying macro layer. That is, the femto stations 22 may operate on the same frequency as the associated base station 12 or may have a dedicated local frequency band. The nodes 22 may additionally or alternatively operate in an unlicensed band. Unlicensed bands are frequency bands where operators and users do not need any license to utilize the bands and typically have only power or power density restrictions—established by telecommunication regulation bodies—need to be observed. Some unlicensed bands have been initially reserved for industrial, scientific and medical purposes and are hence often referred to as ISM radio bands. A well known unlicensed band is the 2.4 GHz band used for WLAN access in a multitude of countries.

The femto access nodes may provide operation in a licensed or unlicensed band. The operation may also be out of the network operator control. The femto access points may have a plug-and-play mode of operation with control, reduced control or no control from the core network. To address the reduced, or no control, the access points can rely on self-organizing functionality. The access points may be arranged to facilitate operations in a dynamic, self-organizing network (SON) based radio environment. These nodes may thus be referred to as optimised local area access points or stations.

Figure 2:
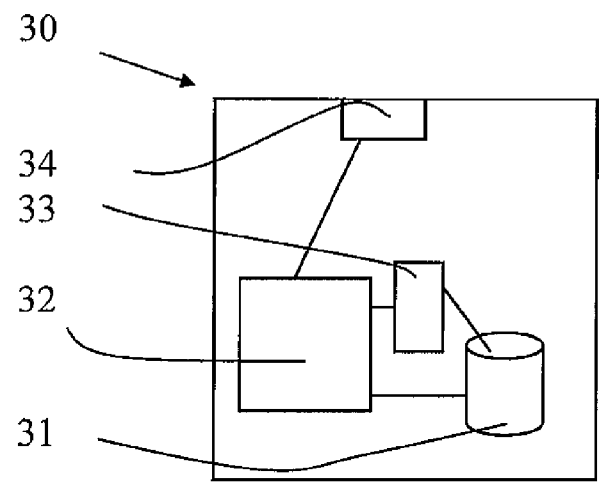

An access node is typically controlled by at least one appropriate controller entity so as to enable operation thereof and management of mobile user devices in communication with the node. Reference is made to FIG. 2 which shows an example for a controller apparatus 30. The controller entity is typically provided with memory capacity and at least one data processor. The control entity can be interconnected with other control entities. FIG. 2 thus shows at least one memory 31, at least one data processing unit 32 and an input/output interface 34. The control apparatus can further comprise an interference conflict resolution block 33. The controller may be configured to execute appropriate software applications to provide the desired control functions. At least some of the processing of the processing blocks may be carried out by one or more processors in conjunction with one or more memories. The processing block may be provided by an integrated circuit or a chip set.

FIG. 1 further shows gateway nodes 14 and 24. In this example gateway nodes 14 are provided for connecting the femto level system 20 access nodes 22 to the macro level system 10 via S1 interfaces. Gateway node 24 provides connection between the femto access nodes 22 via S1 interfaces. There are various possible interaction methods between the various nodes, and the following gives a few examples how to support an interface (denoted by X2 in FIG. 1) that can also be used directly between the femto nodes 20 (HeNBs) to support interference management (IM) in accordance with the embodiments. In accordance with a possibility a new S1 message can be defined. Load Information can be defined in S1 application protocol (S1AP) message. This new S1 message can be communicated to the target HeNB via a mobility management entity (MME)/HeNB gateway (GW). In accordance with another possibility a new X2 message container information element (IE) is defined within an S1 message. This is a transparent way to piggyback a single X2 message within an S1 message. A direct X2 interface can also be defined between the femto nodes (HeNBs). Load Information can in this solution be defined in X2AP. The arrangement can be such that only those HeNBs that appear in the neighbor of a HeNB list can setup a X2 connection. Thus the arrangement can be kept simple in that one HeNB only keeps a few connections with neighboring HeNBs.

Although not shown, a gateway function between the access systems, a core network and/or another network such as the packet data network may be provided by means of appropriate gateway nodes. Regardless of the gateway arrangement, the base station serving a communication device can be connected to an external data network, for example the internet.

A brief explanation of some possible interference scenarios is now given with reference to Table 1 wherein six scenarios for interference management are presented. Four of the scenarios are between macro and femto systems and two are between femto systems.

TABLE 1

| Interference management scenarios | | | | | |
|---|---|---|---|---|---|
| From Femto to Macro | DL | 1 | HeNB | MUE |
| | UL | 2 | HUE | eNB |
| From Macro to Femto | DL | 3 | eNB | HUE |
| | UL | 4 | MUE | HeNB |
| From Femto to Femto | DL | 5 | HeNB | HUE |
| | UL | 6 | HUE | HeNB |

Scenarios 1, 3 and 5 relate to downlink interference management (DL IM). Scenarios 2, 4 and 6 relate to uplink interference management. The following detailed examples focus on DL IM, especially on scenario 5, i.e., DL IM between different HeNBs. This is considered as a particularly relevant aspect because there are a lot of femto cells in the area of a macro cell.

Figure 3:
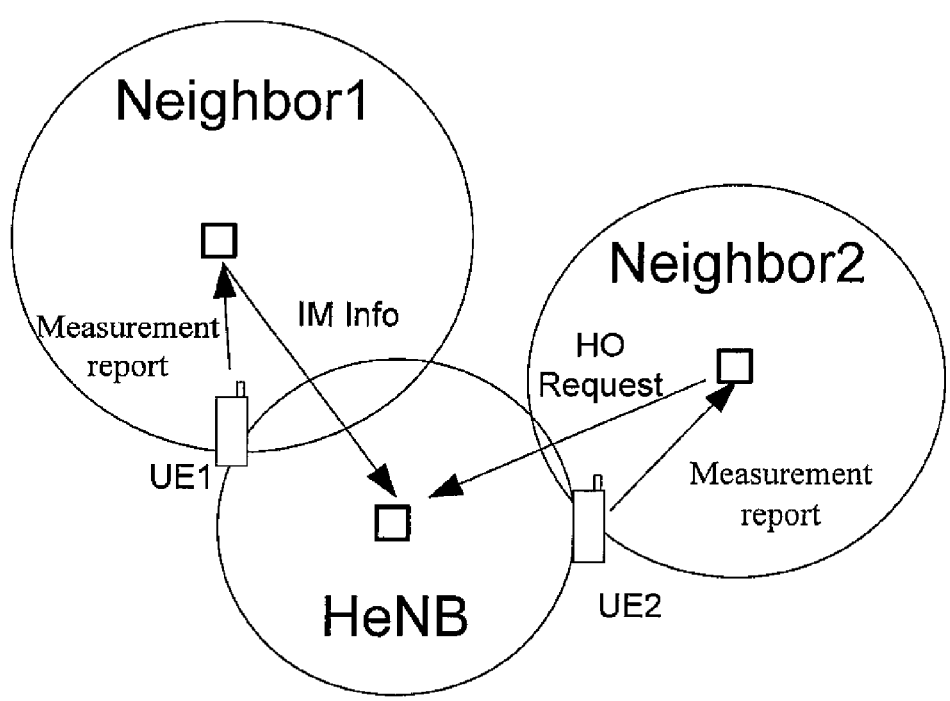

The following considers the interference scenario shown in FIG. 3 as an example. As illustrated in FIG. 3, a communication device UE1 is served by an access node provided by Neighbor1 and a communication device UE2 is served by an access node provided by Neighbor2. Neighbor1 and Neighbor2 may be provided by macro base station (s) (eNB) and/or home base station(s) (HeNB). Neighbor1 detects downlink interference to communication device UE1 from an interfering station HeNB. The detection may be based on measurement results from the communication device UE1. Measurements that a communication device can perform and triggering thereof can be provided by any appropriate manner. For example, the measurements of the strength of interference by the communication devices can be triggered by detection of large downlink interference. At the same time, Neighbor2 also detects the downlink interference from HeNB to communication device UE2. Neighbor2 finds that the handover HO condition is satisfied, and thus Neighbor2 prepares to handover the communication device UE2 to HeNB. Neighbor2 sends handover (HO) request to HeNB. A problematic situation may occur now, which is illustrated by the following example.

For example, communication device UE1 of FIG. 3 can measure and send a measurement report to its serving station, or Neighbor1. After receipt of the measurement report, Neighbor1 analyzes the measurement report and determines that the main interfering source is HeNB. This interfering station is denoted as HeNB in FIG. 3. Therefore a possibility of mitigating the interference is to adjust the transmission (Tx) power of the interfering station (HeNB). Neighbor1 can then send interference information to HeNB in an attempt to get the HeNB to reduce its Tx power to mitigate the downlink interference to the communication device UE1 it is serving. Here, a measurement report by a communication device UE2 can be triggered for example because of the better radio link quality from HeNB. Communication device UE2 can send the measurement report to its serving station, i.e. to Neighbor2 in the FIG. 3. Neighbor2 may find that handover condition is satisfied and prepare to handover (HO) communication device UE2 to HeNB as an interference management action. This can be done if communication device UE2 belongs to a closed subscriber group (CSG) or the HeNB is a hybrid or open HeNB. The Neighbor2 sends a HO Request message to HeNB. It is noted that these two possible interference management actions are only described to assist understanding of the examples below and are not anyhow intended to limit the possible action by these two.

Therefore the situation can be such that HeNB should reduce its Tx power to reduce the downlink interference to communication device UE1, and HeNB should consider handover of communication device UE2 from Neighbor2 because HeNB belongs to the CSG list of communication device UE2 or HeNB is a hybrid/open cell. However, if HeNB satisfies the downlink interference mitigation for UE1 through reducing the Tx power of HeNB, it may not satisfy the requirement of Neighbor2 because the radio link quality from HeNB to communication device UE2 may become too bad to accept a handover of communication device UE2. If HeNB decides to accept the handover, its Tx power may not be reduced, thus conflicting the requirement of Neighbor1. Certain possible embodiments addressing such a conflict situation are described below with reference to FIGS. 4 to 7.

Figure 4:
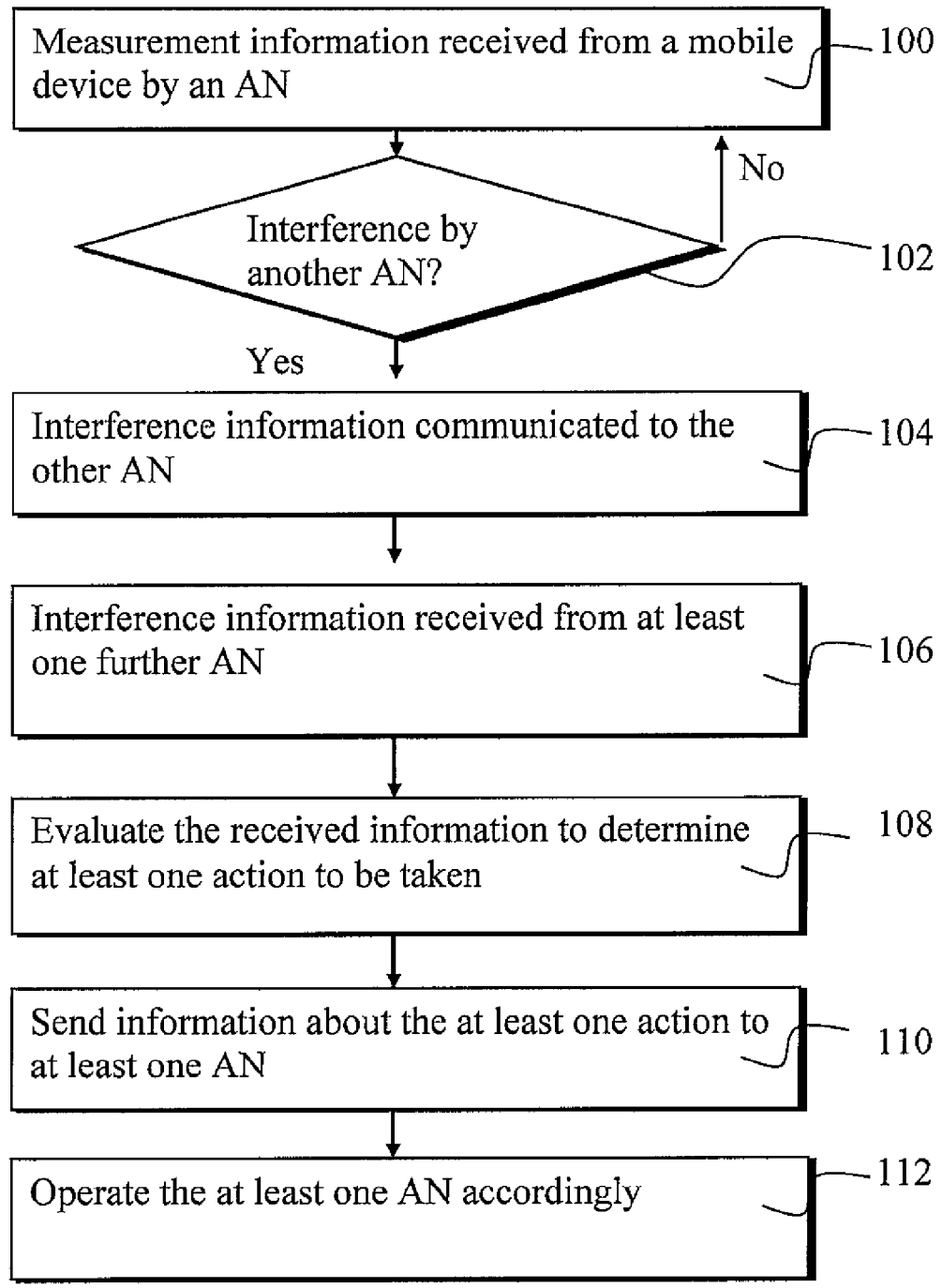
FIG. 4 is a flowchart showing an embodiment.

In accordance with an embodiment shown in the flowchart of FIG. 4, a first access node receives measurement information from a mobile communication device at 100. Upon analysis thereof the first access node detects at 102 the communication device is interfered by another, neighbouring access node. It then sends at 104 to the other access node interference information. The interfering access node receives the interference information from the first access node. Substantially at the same time the interfering access node also receives at 106 interference information from at least one further or third access node serving communication devices that are interfered by the access node. The interfering access node then evaluates the received interference information from the plurality of access nodes to determine at least one action that could be taken because of the interference caused at 108. It can then send at 110 information about the at least one action to at least one of the access nodes serving interfered communication devices. Upon receipt of the information the other access nodes can be operated at 112 such that the received information is taken into account.

Figure 5:
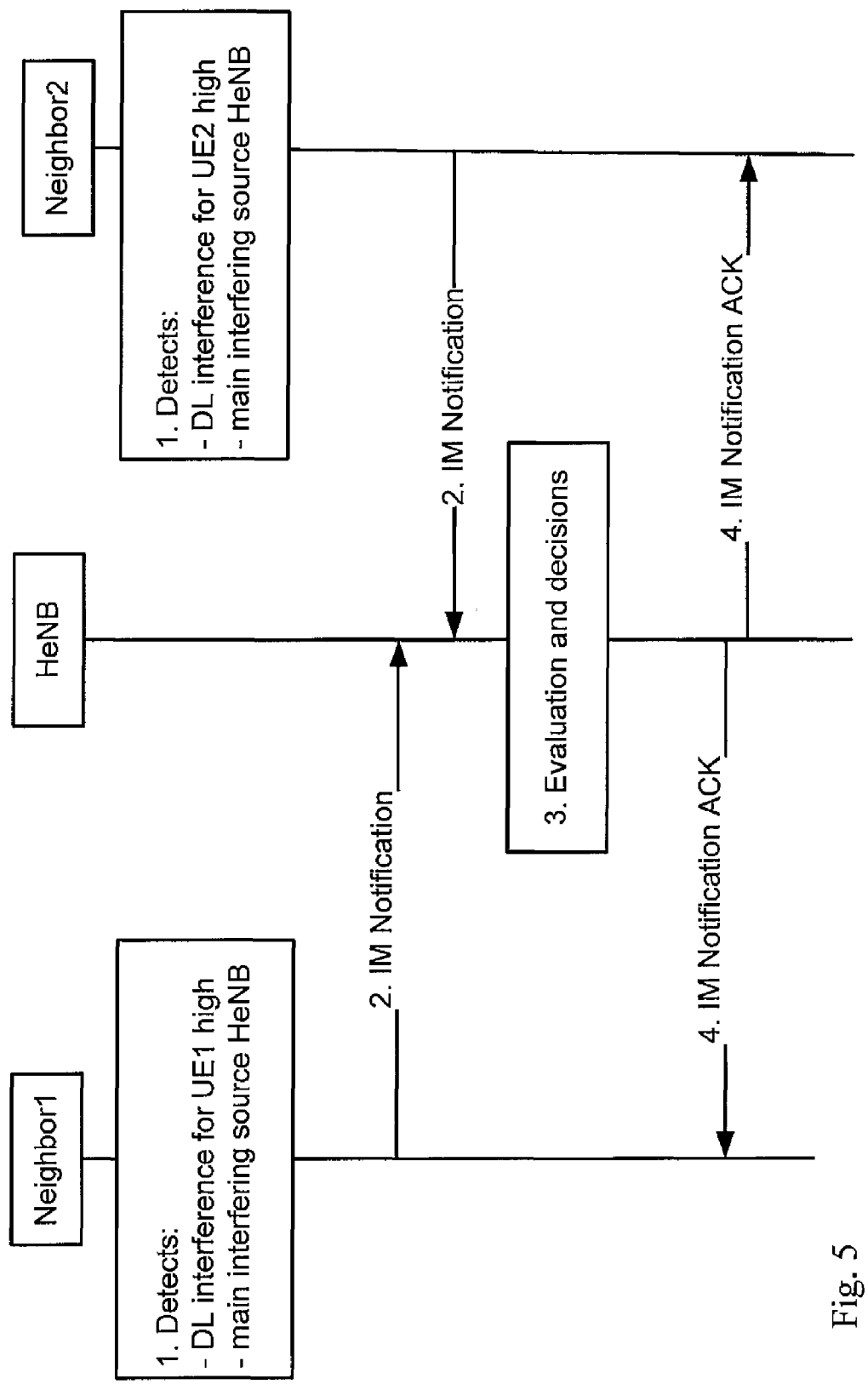
FIGS. 5 to 7 show further embodiments.

In accordance with a more detailed example, the access nodes serving the interfered communication devices provide information to the interfering node where after the interfering node can make a network level decision, and more particularly a self organizing network decision (SON). A more detailed example of this is shown in FIG. 5. As step 1 Neighbor1 and Neighbor2 detect that HeNB causes downlink interference to UE1 and UE2, respectively. Neighbor1 may perform a pre-evaluation and considers that reducing HeNB's Tx power would be a solution. Neighbor2 may also perform a pre-evaluation and considers that handover of the inferred UE2 would be a good solution. However, the stations Neighbor1 and Neighbor2 serving the interfered communication devices, UE1 and UE2, do not make any self organizing network (SON) level decisions in response to receiving the measurement reports. Instead, the stations provide necessary interference management information to the interfering station HeNB. The neighboring stations serving the interfered communication devices can send interference management (IM) Notifications to the interfering HeNB. The notification message includes interference information such as measurement reports by the interfered communication devices, Physical Resource Block (PRB) usages, indication whether or not HeNB belongs to the relevant CSG lists, interference level (for example low, middle and high), Radio Link Failure (RLF) risk and so on. The neighbor stations serving the interfered communication devices may also give SON suggestions on interference management (IM) to the interfering HeNB. This information can be used to provide their preference on interference management (IM) action, e.g. adjust Tx power, adjust Physical Resource Block (PRB) usage, handover the interfered communication device, and so on. The information can be sent as a new defined message, or piggybacked on existing messages.

The interfering HeNB can then perform an evaluation and make a decision based on the received info, SON suggestions and its own measurement parameters. Non-limiting examples of the possible decisions include a decision to adjust the transmission (Tx) power of the interfering station, to adjust PRB assignment to the users of the interfering station, to accept a suggested handover, switch off one or more radio transmissions, ask for new measurement results, and so on.

The interfering HeNB can then send feedback information to the neighbor stations. For example, it can send an IM Notification acknowledgement (ACK) together with its final decision. In the shown example the decision is to keep the Tx power and to accept the handover. The neighbouring stations Neighbor1 and Neighbor2 can then act accordingly.

Figure 6:
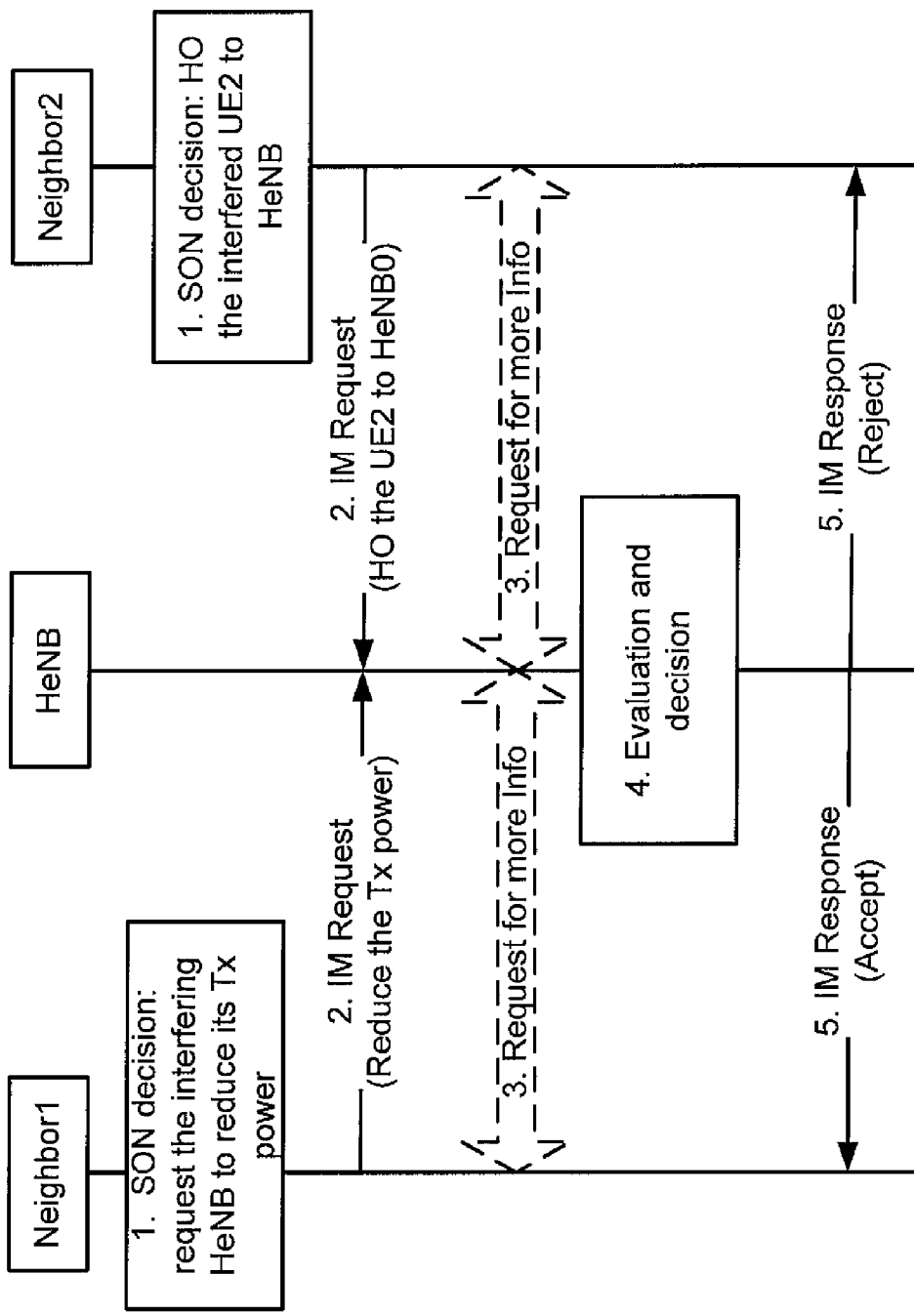
Figure 7:
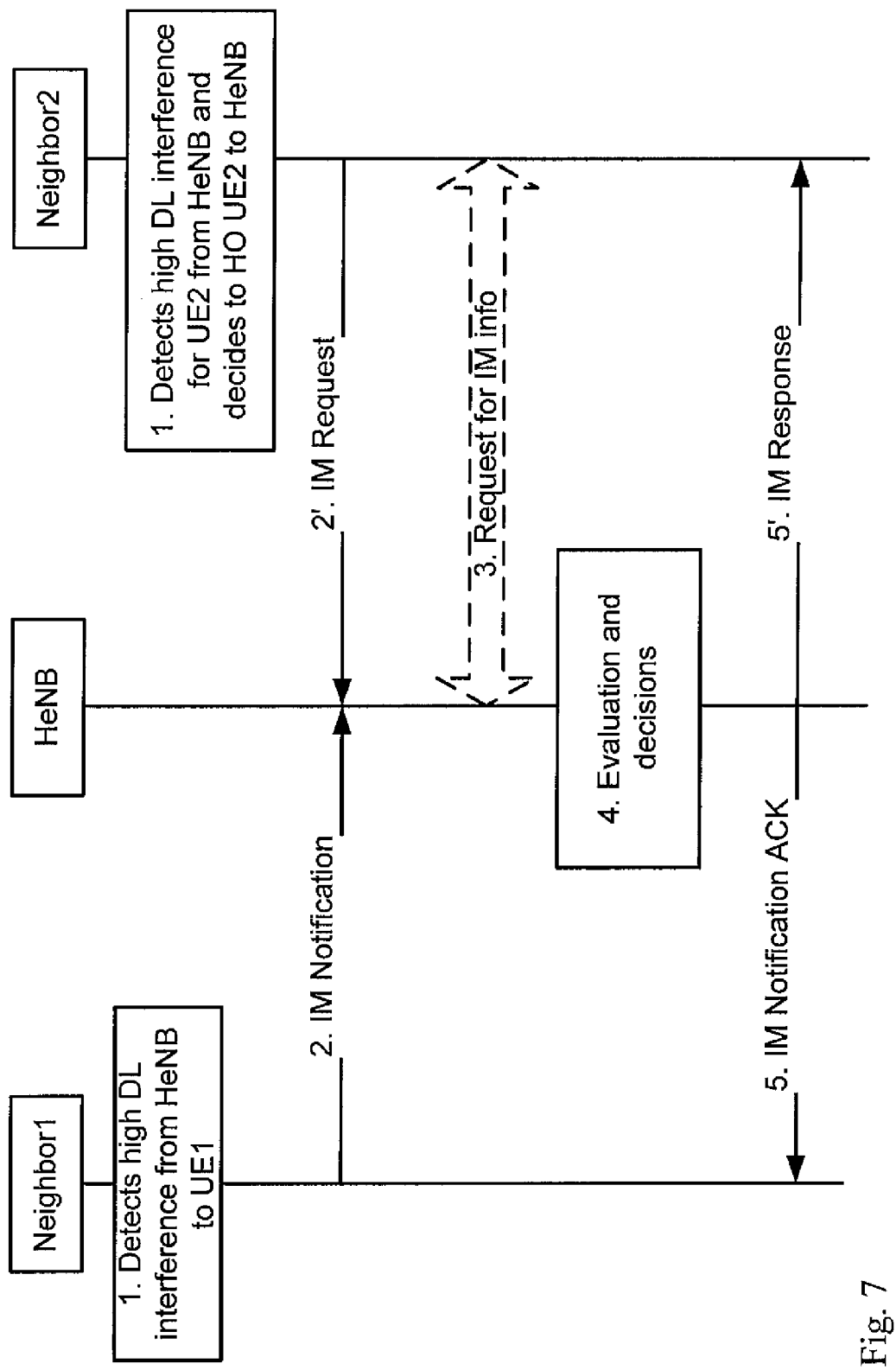

In accordance with another embodiment shown in FIG. 6 access nodes provided by neighbor stations serving the interfered communication devices make self-organizing network (SON) decisions and then send IM Requests to the interfering HeNB accordingly. For example, Both Neighbor1 and Neighbor2 detect that HeNB cause interference to their UEs (UE1 and UE2, respectively). Neighbor1 evaluates by itself and makes as step 1 the SON decision to request HeNB to reduce its Tx power to mitigate the DL interference. Similar to Neighbor1, Neighbor2 can also make a SON decision to handover UE2 to HeNB. The HeNBs serving the interfered communication devices can send the decision as an interference information to the interfering station for example by means of interference management (IM) requests. Thus Neighbor1 can request for reduction of Tx power of the interfering station and Neighbor2 request for handover of UE2, as denoted by step 2. The request can be a new defined message, or piggybacked in an existing message.

A problem is that Neighbor1 and Neighbor2 now send an IM Request containing a different SON decision to HeNB. The interfering HeNB thus needs to evaluate how to resolve the situation and which command it can follow, as shown by step 3. It can then send feedback information regarding its decision, for example by means of IM Response messages containing the decision. Thus in the last step (5) the HeNB is shown to send IM Response with "Accept" to Neighbor1 to inform it that HeNB has reduced the Tx power. HeNB also sends IM Response with "Reject" to Neighbor2 to inform it that HeNB has reduced the Tx power and asks Neighbor2 to perform a new measurement. The information can be a new defined message, or piggybacked on the existing messages.

The interfering station HeNB may also decide that it does not have enough information to be able to make a decision. Thus it can request for more information to the neighbor stations serving the interfered communication devices at step 3. The additional information can then be received and used for SON evaluation and decision. If the HeNB determines that it would benefit from more information for the evaluation and decision, it can send a request for information to both Neighbor1 and Neighbor2, or just to one station. The request may ask for, for example, fresh measurement reports, Physical Resource Block (PRB) usages, indication whether or not the HeNB belongs to a relevant CSG list, and so on. This could be cone by means of new defined messages, or piggybacked on the existing messages.

In FIG. 6 the HeNB accepts one of the commands, i.e. reduction of TX power. In this example the decision is made to satisfy the requirements of Neighbor1. This, however, is not the only option, and the interfering HeNB may have a wide variety of possible actions available. For example, it can adjust PRB, or turn off radio frequency (RF) transmission if there are few active communication devices or no active communication devices at all.

A possible embodiment is provided by a combination of the above two scenarios. In the scenario shown in FIG. 7 some neighbor stations serving interfered communication devices can make SON decisions and then send IM Requests to the interfering station, HeNB, while some others do not make SON decisions but only send IM Notifications with interference information to the interfering HeNB. For example, although both Neighbor1 and Neighbor2 can detect that HeNB is the source of downlink interference for communication devices UE1 and UE2, Neighbor1 may not provide a pre-decision but only collects the interference management (IM) information. Neighbor2, on the other hand, may provide a SON decision to handover communication device UE2 to HeNB at step 1.

At step 2 Neighbor1 sends IM info to HeNB. In step 2' Neighbor2 can send IM Request to HeNB for handover. In this message, the information necessary for the evaluation may be included.

The interfering HeNB can then make a decision based on its own status, the commands and other information received from the neighbours. The interfering HeNB can then feedback its decision to the neighbour stations serving the interfered communication devices. Thus, at step 4 HeNB performs evaluation based on the received interference management information from Neighbor1 and interference management (IM) request from Neighbor2 and makes the decision to accept the handover and at the same time reduce the acceptable Tx power based on the information from neighbour stations. At step 5 the HeNB sends an IM notification Ack with "Reduce Tx power" to Neighbor1 to inform it that HeNB has reduced the Tx power. At step 5' the HeNB sends IN Response with the result "Accept the HO" to Neighbor2.

If the HeNB determines that more information is required for the evaluation and decision, it can optionally send a request for more info to Neighbor2 at step 3 before the evaluation and decision making. In the example shown in FIG. 7, the IM Request/Response from Neighbor2 can be replaced by the existing handover Request/Response messages.

The herein described embodiments introduce an interference coordination scheme between the access nodes. There are different options for dealing the conflict, depending on which entity does the resolution. A node receiving contradicting orders can be allowed to decide whose orders to follow. This can be decided based on the best knowledge of the node or after issuance of an additional request or requests to provide more information. In some of the embodiments the stations serving the interfered communication devices only provide comprehensive information instead of a direct order of what to do, and it is left to the interfering station to decide what shall be done to address the interference situation.

The required data processing apparatus and functions of an access point or access node as well as an appropriate communication device may be provided by means of one or more data processors. The above described functions may be provided by separate processors or by an integrated processor. The data processing may be distributed across several data processing modules. A data processor may be provided by means of, for example, at least one chip. Appropriate memory capacity can also be provided in the relevant nodes. An appropriately adapted computer program code product or products may be used for implementing the embodiments, when loaded on an appropriate data processing apparatus, for example in a processor apparatus associated with the access point or node and/or a data processing apparatus associated with a communication device. The program code product for providing the operation may be stored on, provided and embodied by means of an appropriate carrier medium. An appropriate computer program can be embodied on a computer readable record medium. A possibility is to download the program code product via a data network.

It is noted that whilst embodiments have been described in relation to LTE, similar principles can be applied to any other wireless communication system to support uncoordinated local area deployments. Therefore, although certain embodiments were described above by way of example with reference to certain exemplifying architectures for wireless networks, technologies and standards, embodiments may be applied to any other suitable forms of communication systems than those illustrated and described herein. For example, similar principles can be applied to 3GPP 3G femto and all other femto technologies, for example WiMAX systems.

It is also noted herein that while the above describes exemplifying embodiments of the invention, there are several variations and modifications which may be made to the disclosed solution without departing from the scope of the present invention.

What is claimed is:

1. A method comprising:
   receiving, at an access node in a self-organizing system, downlink interference information from at least two other access nodes without conveying the information via mobile communication devices,
      wherein the other access nodes serve communication devices that are interfered,
      wherein the received downlink interference information comprises information about downlink Physical Resource Block usage and a suggestion regarding at least one action to be taken to reduce the downlink interference, and
      wherein the at least one action comprises at least one of adjusting physical resource block usage, adjusting transmission power, and;
   evaluating the downlink interference information at the access node to at least one action that could be taken to reduce the downlink interference; and
   sending information about the at least one action to at least one of the at least two other access nodes without conveying the information via mobile communication devices.

2. The method of claim 1, further comprising making at the access node a network level decision in view of at least one action to be taken.

3. The method of claim 2, further comprising sending information about the network level decision to at least one of the at least two other access nodes.

4. The method of claim 2, wherein the receiving comprises receiving interference management notifications from the at least two other access nodes, and the sending of information comprises sending of acknowledgements to the interference management notifications, the acknowledgements including information about the network level decision by the access node.

5. The method of claim 1, wherein the received interference information comprises network level decisions by the at least two other access nodes, the method comprising determining by the access node that the network level decisions are in conflict, selecting one of the network level decisions, and based on the selection, sending from the access node information about at least one action that shall be taken by the at least one other access node.

6. The method of claim 5, wherein the receiving comprises receiving interference management requests from the at least two other access nodes, and the sending of information comprises sending of responses to the interference management requests, the responses comprising either an acceptance or rejection of the request.

7. The method of claim 1,
   wherein the received interference information comprises at least one request based on a network level decision by one other access node and at least one notification based on evaluation by another other access node, and
   wherein the evaluation by the access node comprises evaluation of the received interference information to determine if the request shall be accepted or rejected and the sending comprises sending a response to the request and an acknowledgment to the notification accordingly.

8. The method of claim 1, wherein the interference information comprises at least one of measurement reports by interfered communication devices, information about downlink Physical Resource Block usage by the interfered communication devices, an indication if the access node belongs to a closed subscriber group of at least one of the interfered communication devices, information about interference level(s), and information about the risk of a Radio Link Failure.

9. The method of claim 1, wherein the received interference information is based on reports by communication devices served by the at least two other access nodes.

10. A computer program product embodied on a non-transitory computer-readable medium in which a computer program is stored that, when being executed by a computer, is configured to provide instructions to control or carry out the method of claim 1.

11. A method comprising:
    detecting, at an access node serving in a self-organizing system, at least one communication device under downlink interference;
    sending to another access node interference information from the access node without conveying the information via mobile communication devices,
       wherein the sent interference information comprises information about downlink Physical Resource Block usage and a suggestion regarding at least one action to be taken to reduce the downlink interference, and
       wherein the at least one action comprises at least one of adjusting physical resource block usage and transmission power; and
    receiving at the access node information from the other access node without conveying the information via mobile communication devices about at least one action that can be taken to mitigate the effects of the interference, said at least one action being determined based on said interference information by the access node and interference information from at least one further access node serving at least one further communication device that is under interference; and
    operating the access node by taking into account the received information.

12. The method of claim 11, further comprising receiving from the other access node a network level decision in view of at least one action to be taken.

13. The method of claim 12, wherein the sending comprises sending of an interference management notification, and the receiving of information comprises receiving of an acknowledgement to the interference management notification, the acknowledgement including information about the network level decision by the other access node.

14. An apparatus, comprising at least one processor and at least one memory including computer program code, wherein the at least one memory and the computer code are configured to, with the at least one processor, cause the apparatus to at least perform or control the following:
    receiving, at an access node in a self-organizing system, downlink interference information from at least two other access nodes without conveying the information via mobile communication devices, wherein the other access nodes serve communication devices that are interfered, wherein the received downlink interference information comprises information about downlink Physical Resource Block usage and a suggestion regarding at least one action to be taken to reduce the downlink interference, and wherein the at least one action comprises at least one of adjusting physical resource block usage and transmission power;

evaluating the downlink interference information at the access node to at least one action that could be taken to reduce the downlink interference; and sending information about the at least one action to at least one of the at least two other access nodes without conveying the information via mobile communication devices.

15. The apparatus of claim 14, wherein the at least one memory and the computer code are further configured to, with the at least one processor, to further cause the apparatus to at least perform or control the following:

making a network level decision in view of at least one action to be taken.

16. The apparatus of claim 15, wherein the at least one memory and the computer code are further configured to, with the at least one processor, further cause the apparatus to at least perform or control the following:

sending of information about the network level decision to at least one of the at least two other access nodes.

17. The apparatus of claim 14, wherein the at least one memory and the computer code are further configured to, with the at least one processor, further cause the apparatus to at least perform or control the following:

evaluating interference management notifications from the at least two other access nodes, and causing sending of acknowledgements to the interference management notifications, wherein the acknowledgements include information about the network level decision by the access node.

18. The apparatus of claim 14, wherein the at least one memory and the computer code are further configured to, with the at least one processor, further cause the apparatus to at least perform or control the following:

evaluating network level decisions by the at least two other access nodes;

determining when the network level decisions are in conflict;

selecting one of the conflicting network level decisions; and based on the selecting, causing sending of information about at least one action that shall be taken by at least one other access node.

19. The apparatus of claim 18, wherein the at least one memory and the computer code are further configured to, with the at least one processor, further cause the apparatus to at least perform or control the following:

evaluating interference management requests from the at least two other access nodes to reject or accept the requests.

20. The apparatus of claim 14, wherein the at least one memory and the computer code are further configured to, with the at least one processor, further cause the apparatus to at least perform or control the following:

evaluating at least one request based on a network level decision by one other access node and at least one notification based on evaluation by another other access node, wherein the evaluation comprises evaluation of interference information to determine if the request shall be accepted or rejected, and causing sending of a response to the request and an acknowledgment to the notification accordingly.

* * * * *